(12) United States Patent
Verbowski (10) Patent No.: US 7,494,143 B2
(45) Date of Patent: Feb. 24, 2009

(54) ADJUSTABLE TORSION BAR LEVER

(76) Inventor: Larry J. Verbowski, 1875 Freeland Rd., Bay City, MI (US) 48706

(*) Notice: Subject to any disclaimer, the term of this patent is extended or adjusted under 35 U.S.C. 154(b) by 403 days.

(21) Appl. No.: 10/829,535

(22) Filed: Apr. 22, 2004

(65) Prior Publication Data
US 2004/0212168 A1 Oct. 28, 2004

Related U.S. Application Data

(60) Provisional application No. 60/465,254, filed on Apr. 24, 2003.

(51) Int. Cl.
*B60G 11/18* (2006.01)
(52) U.S. Cl. .................. 280/124.166; 267/273; 267/277; 267/278; 280/6.157; 280/124.167
(58) Field of Classification Search ................. 280/124.166–124.169, 6.157; 267/273, 267/277, 278
See application file for complete search history.

(56) References Cited

U.S. PATENT DOCUMENTS

| | | | |
|---|---|---|---|
| 2,713,484 A | | 7/1955 | Pierce |
| 3,432,158 A | | 3/1969 | Goodwin |
| 4,033,605 A | * | 7/1977 | Smith et al. ............... 280/6.157 |
| 4,243,247 A | | 1/1981 | Kataoka |
| 4,635,958 A | * | 1/1987 | Yonemoto ............ 280/124.137 |
| 4,863,148 A | * | 9/1989 | Hufnagel .................... 267/278 |
| 4,962,943 A | * | 10/1990 | Lin .......................... 280/5.511 |
| 5,163,701 A | * | 11/1992 | Cromley, Jr. ............ 280/124.13 |
| 5,186,216 A | | 2/1993 | Bollier |
| 5,255,936 A | * | 10/1993 | Velazquez ................ 280/6.157 |
| 5,332,255 A | * | 7/1994 | Velazquez .............. 280/86.754 |
| 5,487,443 A | * | 1/1996 | Thurm ....................... 180/227 |
| 5,538,229 A | * | 7/1996 | Kmiec ........................ 267/189 |
| 5,609,331 A | * | 3/1997 | Hoag et al. ................. 267/154 |
| 5,685,527 A | * | 11/1997 | Harbali et al. .............. 267/277 |
| 5,921,569 A | * | 7/1999 | Noutomi et al. ........ 280/124.167 |
| 6,364,297 B1 | | 4/2002 | Weber |
| 6,398,451 B1 | * | 6/2002 | Zetterstrom ................. 403/347 |
| 6,447,073 B1 | * | 9/2002 | Goettker ..................... 301/127 |
| 6,454,284 B1 | | 9/2002 | Worman, Jr. |
| 6,641,151 B1 | * | 11/2003 | Zetterstrom .......... 280/124.107 |

(Continued)

*Primary Examiner*—Eric Culbreth
(74) *Attorney, Agent, or Firm*—Robert L. Stearns; Dickinson Wright PLLC (57) ABSTRACT

A suspension assembly (40) in an automobile vehicle includes a support frame (42), a control arm (44) movable relative to the support frame (42), and a torsion bar (46) connected to the control arm (44) for resisting movement of the control arm (44). An adjustment lever (50, 150, 250, 350, 450, 550, 650) is connected to the torsion bar (46) for placing the torsion bar (46) in torsion. A hub (74, 174, 274, 374, 474, 574, 674) is positioned in a socket in the adjustment lever (50, 150, 250, 350, 450, 550, 650) for connecting the adjustment lever (50, 150, 250, 350, 450, 550, 650) to the torsion bar (46) at a plurality of primary drive positions at first angular increments as defined by a hexagonal connection. The hub (74, 174, 274, 374, 474, 574, 674) is connected to the adjustment lever (50, 150, 250, 350, 450, 550, 650) by an indexing system to allow positioning of the adjustment lever (50, 150, 250, 350, 450, 550, 650) at a plurality of intermediate drive positions other than the first angular increments defined by the hexagonal connection to the torsion bar (46).

13 Claims, 7 Drawing Sheets

U.S. PATENT DOCUMENTS 6,767,021 B2 * 7/2004 Schnurpel .............. 280/124.13
6,779,806 B1 * 8/2004 Breitbach et al. ..... 280/124.106
2005/0046138 A1 * 3/2005 Dagg et al. ........... 280/124.166
2008/0048371 A1 * 2/2008 Dagg et al. ................. 267/273

* cited by examiner

ADJUSTABLE TORSION BAR LEVER

RELATED APPLICATION

The subject patent application claims priority to and all the benefits of the U.S. Provisional Patent Application Ser. No. 60/465,254 filed on Apr. 24, 2003.

BACKGROUND OF THE INVENTION

1. Field of the Invention

The subject invention relates to a suspension assembly for an automotive vehicle, and more particularly to a torsion bar suspension system and an adjustment lever for adjusting the torsion in the torsion bar.

2. Description of the Prior Art

A torsion bar suspension system of the type having a suspension height adjusting mechanism is well known in the art and is widely used in an automotive industry today. Such a torsion bar suspension system includes a lower control arm having a typical A-frame construction that mounts the torsion bar at its legs and mounts upper and lower ball joints at its opposite end. A torsion bar adjustment arm, i.e. a lever, is mounted on the torsion bar and has an arm that extends radially from the torsion bar to engage an adjustment bolt carried on the vehicle frame to raise or lower the position of the adjustment arm. Adjusting the position of the adjustment arm has the effect of applying more or less torque on the torsion bar, which in turn raises or lowers the front of the vehicle.

Over time, the torsion bar has a tendency to relax or weaken, causing the front end of the vehicle to sag. When the vehicle is serviced, a technician can raise the front end a certain amount by raising the adjustment arm via the adjustment bolt. However, in many cases, the torsion bar has relaxed beyond the range of adjustment of the arm, such that the vehicle can no longer be brought back into the original specification for alignments. Accordingly, the torsion bar must be replaced at considerable cost.

U.S. Pat. No. 2,713,484 to Pierce, U.S. Pat. No. 3,432,158 to Goodwin, U.S. Pat. No. 4,243,247 to Kataoka, U.S. Pat. No. 4,863,148 to Hufnagel, U.S. Pat. No. 5,186,216 to Bollier, U.S. Pat. No. 6,364,297 to Weber, and U.S. Pat. No. 6,454,284 to Worman, Jr. show a variety of mechanisms and suspension systems for adjusting the torsion in a torsion bar to adjust the height of the front end of the vehicle. Many of these prior art designs are complex, bulky in structure and require considerable space under the vehicle body to allow the operator to adjust the systems. Furthermore, at least some current designs require replacement of the relaxed torsion bar to restore a ride height due to insufficient adjustment travel in a production torsion bar adjustment lever.

A need exists for a suspension mechanism or system for adjusting the torsion in a torsion bar without replacing the torsion bar.

BRIEF SUMMARY OF INVENTION

The invention provides an improved adjustment lever for applying torsion to a torsion bar for resisting movement of a control arm movable relative to the support frame in a vehicle. The adjustment lever further includes a torsion bar connection between the adjustment lever and the torsion bar for connecting the adjustment lever to a torsion bar at a plurality of primary drive positions at first angular increments relative to one another. The assembly includes an indexing system for positioning the adjustment lever at a plurality of intermediate drive positions at second angular increments.

An advantage of the present invention is to provide a two-piece adjustment lever for a torsion bar featuring an asymmetric spline arrangement within a fixed hex interface allowing for the torsion bar preload in a plurality of intermediate drive positions other than the first angular increments relative to the torsion bar at angular increments less than the degree increments in the hex interface. As a result, the torsion bar need not be replaced as its range of torsion is significantly increased.

Another advantage of the present invention is to provide the two-piece adjustable lever, which allows for increase or decrease in the ride height per owner preference, thereby increasing road clearance or providing custom vehicle appearance.

Still another advantage of the present invention is to provide the two-piece adjustable lever, which allows adjustment of the ride height to factory specification after the addition of vehicle accessories increases the sprung weight of the vehicle.

Still another advantage of the present invention is to provide the two-piece adjustment lever that is easily removed and calibrated to compensate for added load to the front of the vehicle and to compensate the torsion bar sag or fatigue.

The use of the present invention may allow maintenance of factory ride height to production specification for the life of the vehicle, without the necessity of replacing the torsion bar.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
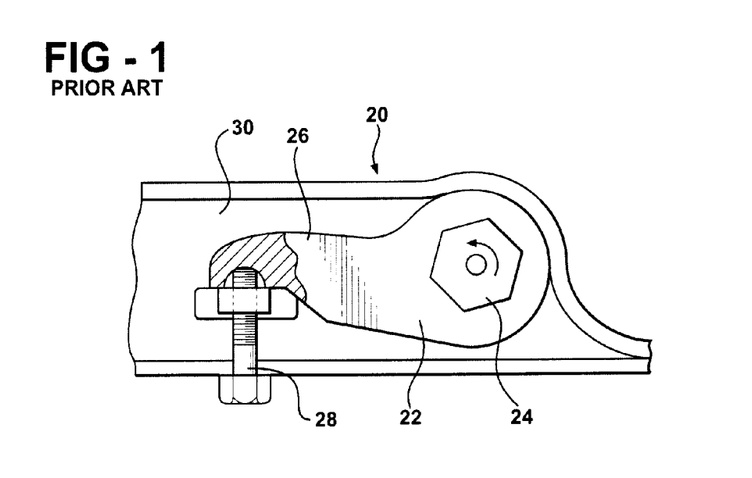
FIG. 1 is a side view of a prior art adjustment lever and a torsion bar assembly design.

An adjustment lever assembly of the prior art is generally shown at 20 in FIG. 1. The prior art adjustment lever assembly 20 includes an adjustment lever 22 connected to a torsion bar 24. The adjustment lever 22 has an arm 26 that extends radially from the torsion bar 24 to be engaged by an adjustment bolt 28. The bolt 28 is carried on a vehicle frame 30 to raise or lower the position of the adjustment lever 22, i.e., pivot the lever 22 about the axis of the torsion bar 24. Over time, the torsion bar 24 has a tendency to relax, i.e., fatigue and loose torsional strength, thereby causing the front end of the vehicle (not shown) to sag. In many cases, the torsion bar 24 relaxes beyond the range of adjustment of the adjustment lever 22, such that the vehicle can no longer be brought back into original specification for alignments. In this case the torsion bar 24 must be replaced at considerable cost.

Figure 2:
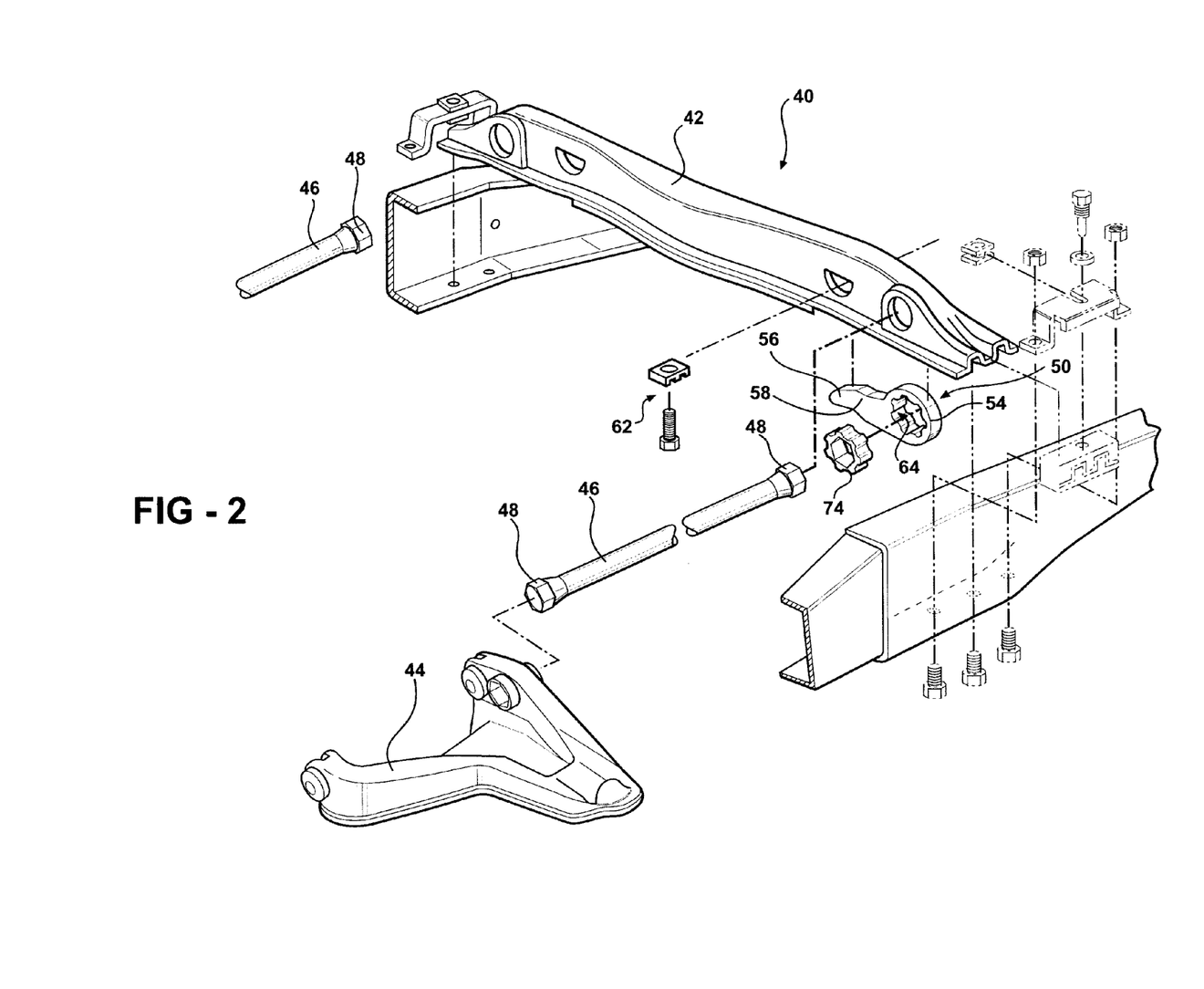
FIG. 2 is an exploded view of a suspension assembly for an automotive vehicle including a first embodiment of an adjustment lever and a hub of the present invention.

Referring to FIG. 2, an automobile vehicle suspension assembly is generally shown at 40. The assembly 40 includes a support frame 42 and a control arm 44 movable relative to the support frame 42. A torsion bar 46 has a hexagonal head 48 at each end and is connected to the control arm 44 for resisting movement of the control arm 44.

Figure 3:
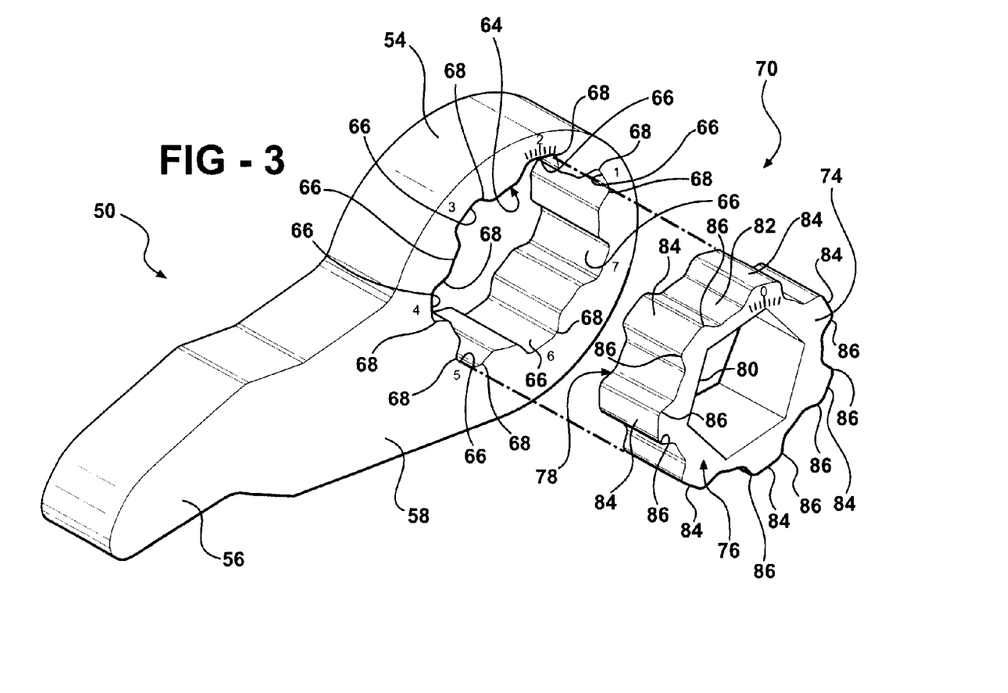
FIG. 3 is a perspective and exploded view of the adjustment lever and the hub shown in FIG. 2.
Figure 4A:
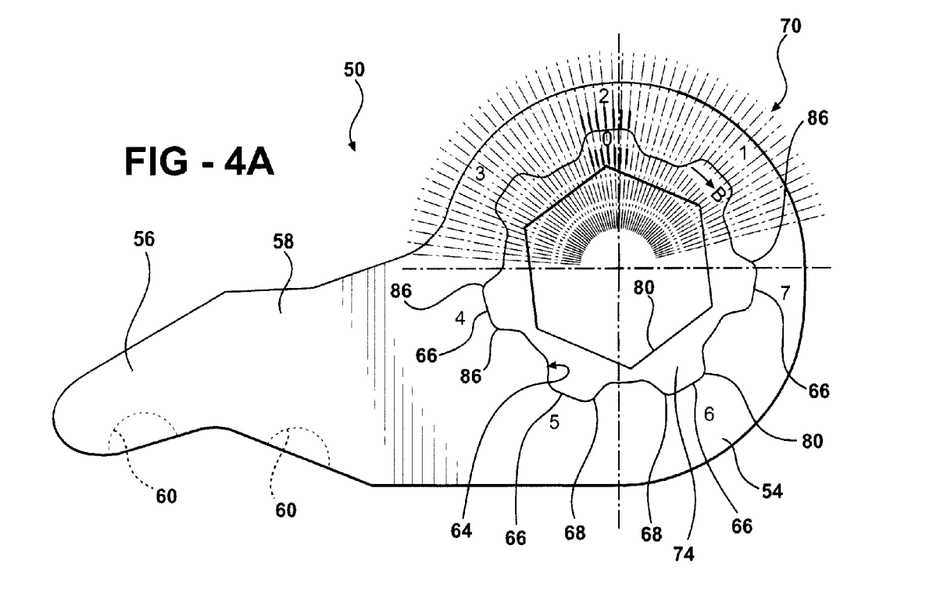
FIG. 4 is a front side view of the adjustment lever and hub shown in FIG. 3.

An adjustment lever, generally shown at 50 in FIGS. 2 through 4, is connected to the torsion bar 46 and is designed for placing the torsion bar 46 in torsion. The adjustment lever 50 includes a pivot portion 54 of generally rounded shape, a tip portion 56, and a central or lever portion 58, extending therebetween. The tip portion 56 includes at least one indentation 60 defined therein and an adjusting mechanism, generally shown at 62 in FIG. 2, is connected to the support frame 42 for engaging the indentation 60 and pivoting the adjustment lever 50 to increase the amount of torsion in the torsion bar 46. The pivot portion 54 includes the hexagonal pocket or socket, generally indicated at 64, with a plurality of tooth cavities 66 of a generally rectangular configuration extending therein. The tooth cavities 66 further include rounded corners 68.

The present invention also includes a torsion bar connection that is positioned between the adjustment lever 50 and the torsion bar 46 for connecting the adjustment lever 50 to the torsion bar 46 at a plurality of primary drive positions at first angular increments relative to one another. The assembly 40 of the present invention further includes an indexing system, generally shown at 70 in FIGS. 3 and 4 for positioning the adjustment lever 50 at a plurality of intermediate drive positions at second angular increments.

The indexing system 70 includes a hub 74 independent of and removably invertible relative to the pocket 64 in the adjustment lever 50. The hub 74 includes two opposite sides, generally indicated at 76 and 78, respectively, that are interconnected by inner 80 and outer 82 surfaces or peripheries. The inner surface 80 of the hub 74 defines a hexagonal socket to receive the hexagonal head 48 of the torsion bar 46 forming the torsion bar connection through which the hub 74 is connected to the torsion bar 46 at the first angular increments. The outer surface or periphery 82 of the hub 74 includes seven teeth 84 extending radially outwardly from the outer surface 82. Each tooth 84 presents a generally rectangular configuration and includes rounded corners 86 that conform to and are complementary to the rounded corners 68 of the tooth cavities 66 in the pocket 64 of the adjustment lever 50. The teeth 84 enable the hub 74 to be positioned angularly with respect to the tooth cavities 66 of the hexagonal socket 64 in any of the plurality of intermediate drive positions other than the plurality of primary drive positions.

As shown in FIG. 4, a tooth numbered 2 presents a center or zero radial line defining a secondary radial extending through the center of the tooth. However, the adjacent apex or corner of the hexagon of the inner socket 80 of the hub 74 defines a primary radial. The primary and secondary radials are offset from one another by an offset angle. The hexagonal socket 64 in the adjustment lever 50 receives the hub 74 but the hub 74 is removable from the hexagonal socket 64 for being inverted 180 degrees about the secondary radial, i.e., the central axis of one of the teeth connecting the hub 74 to the adjustment lever 50. The hub 74 is then reinserted into the hexagonal socket 64 to position the primary radial relative to the secondary radial, e.g., on the opposite angular side of the secondary radial in FIGS. 2-4, whereby the angular position of the adjustment lever 50 may be adjusted by multiples of the offset angle.

Figure 12:
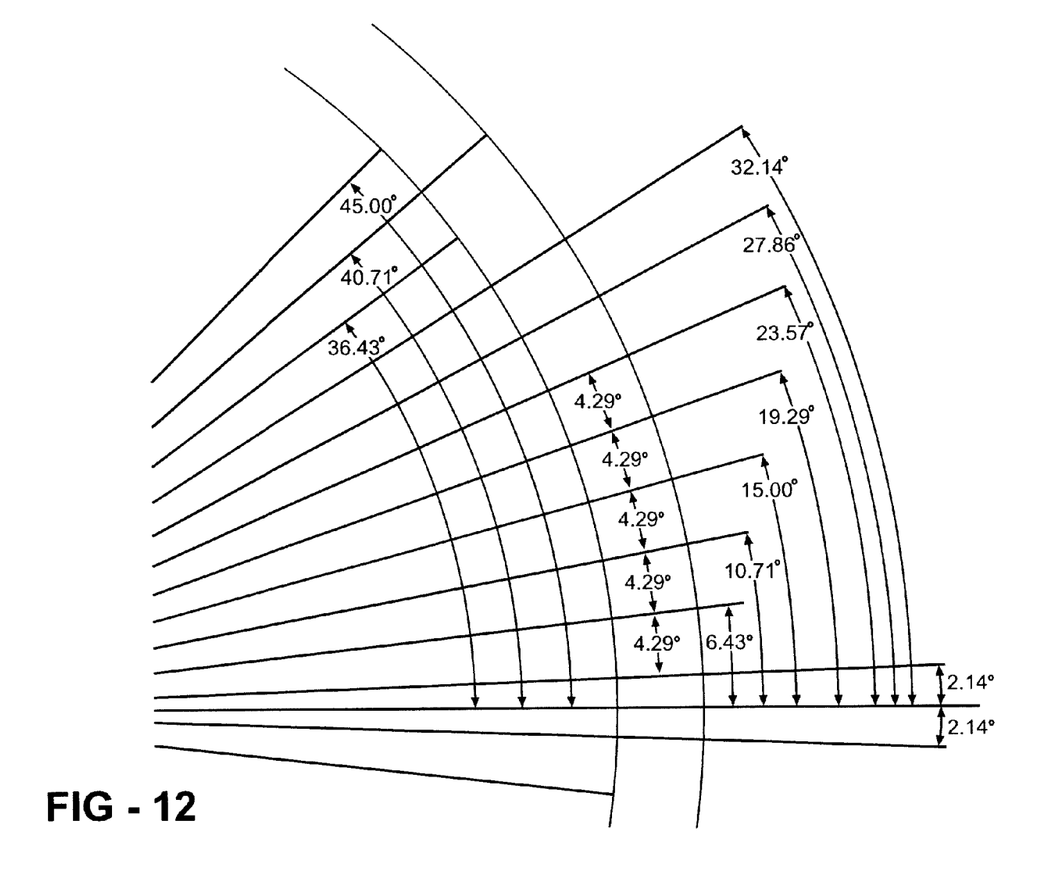
FIG. 12 is a schematic view illustrating the increments of adjustment of the embodiment of FIGS. 2-4.

In the embodiment of FIGS. 2-4, the second angular increments are equal to one another and the offset angle equals one fourth the difference between the first and second increments. Each of the first increments is defined by the sixth sided hexagon and equals 60 degrees whereas the second increments are defined by seven teeth and equals 51.428 degrees. The difference between the first increments defined by the hexagonal socket 64 having the six corners and the second increments defined by the seven teeth 84 equals 8.57 degrees. One half of 8.57 degrees is 4.28 degrees. Accordingly, to obtain 4.28 degrees of adjustment, the offset is one half of that as one fourth of 8.57 degrees, i.e., an offset of 2.14 degrees. When the hub is removed and flipped the adjustment is twice the offset of 2.14 degrees or 4.28 degrees. This is illustrated in FIG. 12.

The adjustment of the lever 50 relative to the torsion bar 46 ranges from +32.14 degrees to −23.57 degrees from starting point of rotation of the hub 74 relative to the adjustment lever 50 by adding and subtracting the offset of 2.14 degrees defined between the primary and secondary radials of rotation of the hub 74 relative to the adjustment lever 50. The table shown further below illustrates various adjustment ranges of the hub 74 relative to the adjustment lever 50 as the hub 74 is removed, inverted and reinstalled into the hexagonal socket 64 in the adjustment lever 50, wherein A indicated one of the opposite sides 76 of the hub 74 and B indicates the other of the opposite sides 78 of the hub 74, and numbers 1 through 7 indicate the aforementioned prime drive positions.

| | |
|---|---|
| A1 − 15.00 degrees | B1 − 2.14 degrees |
| A2 − 6.43 degrees | B2 + 6.43 degrees |
| A3 + 2.14 degrees | B3 + 15.0 degrees |
| A4 + 10.71 degrees | B4 + 23.57 degrees |
| A5 + 19.29 degrees | B5 + 32.14 degrees |
| A6 + 27.86 degrees | B6 − 27.86 degrees |
| A7 − 23.57 degrees | B7 − 10.71 degrees |

In this way, a technician (not shown) can determine to what degree the front end of the vehicle needs to be raised and can then orient the hub 74 in the arm portion 54 to effectively position the hub 74 in angular adjustment less than that provided by the hexagonal socket 64. This embodiment eliminates a need of replacement an overly relaxed torsion bar 46 or modification the front suspension system and contributed to sufficient adjustment travel of the adjustment lever 50 relative to the torsion bar 46 and the support frame 42.

Figure 5:
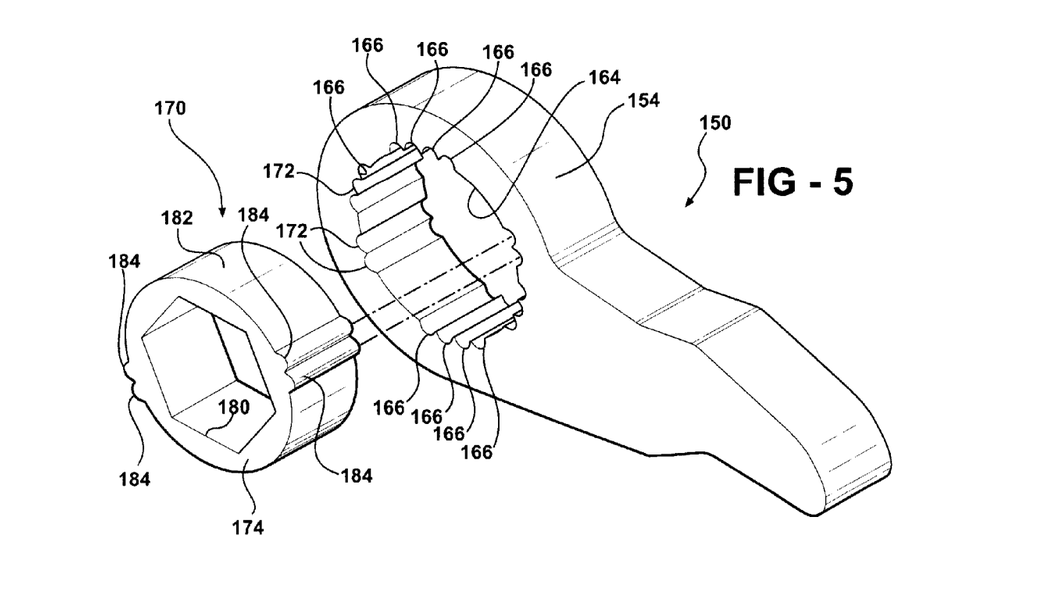
FIG. 5 is a perspective view of a first alternative embodiment of the adjustment lever of the present invention.

FIG. 5 shows a first alternative embodiment of the present invention, wherein like reference numerals are used to indicate like features with regard to the main embodiment but are offset by 100. The adjustment lever 150 includes the pivot portion 154 having the circular socket 164 with the plurality of rounded tooth cavities 166 defined therein. The indexing system of the first alternative embodiment is generally shown at 170 and includes the hub 174 to be disposed in the adjustment lever 150. The hub 174 is independent of and removably invertible relative to the aforementioned adjustment lever 150. The plurality of rounded tooth cavities 166 are disposed on different radials than the first angular increments between the hub 174 and the adjustment lever 150. The rounded tooth cavities 166 are grouped in a variety of selected positions covering a different setting range. In other words, an asymmetric spline arrangement within fixed interface allows 3 degree torsion bar preload increments ranging from −12 degrees to +21 degrees. The rounded tooth cavities 166 are adjacent one another in one group wherein each of the groups are spaced from one another. For example, one of the groups of the tooth cavities 166 may include two of the rounded tooth cavities 166, adjacent one another, followed by another group that includes three of the rounded tooth cavities 166, followed by a third group that includes four rounded tooth cavities 166.

The hub 174 of the first alternative embodiment, as shown in FIG. 5, includes the inner surface or socket 180 having a hexagonal configuration for receiving the hexagonal head 48 of the torsion bar 46, and the outer surface or periphery 182 having a circular configuration. The outer periphery 182 of the hub 174 includes at least one tooth 184 extending outwardly from the outer surface 182. In this embodiment, the tooth 184 has a rounded configuration to complement with the rounded configuration of the tooth cavities 166. Each tooth 184 is spaced diametrically opposite to one another around the outer periphery 182 of the hub 174. The teeth 184 enable the hub 174 to be positioned angularly with respect to the rounded tooth cavities 166 extending inwardly into the circular socket 164 in any of the number of the selected positions.

Figure 6:
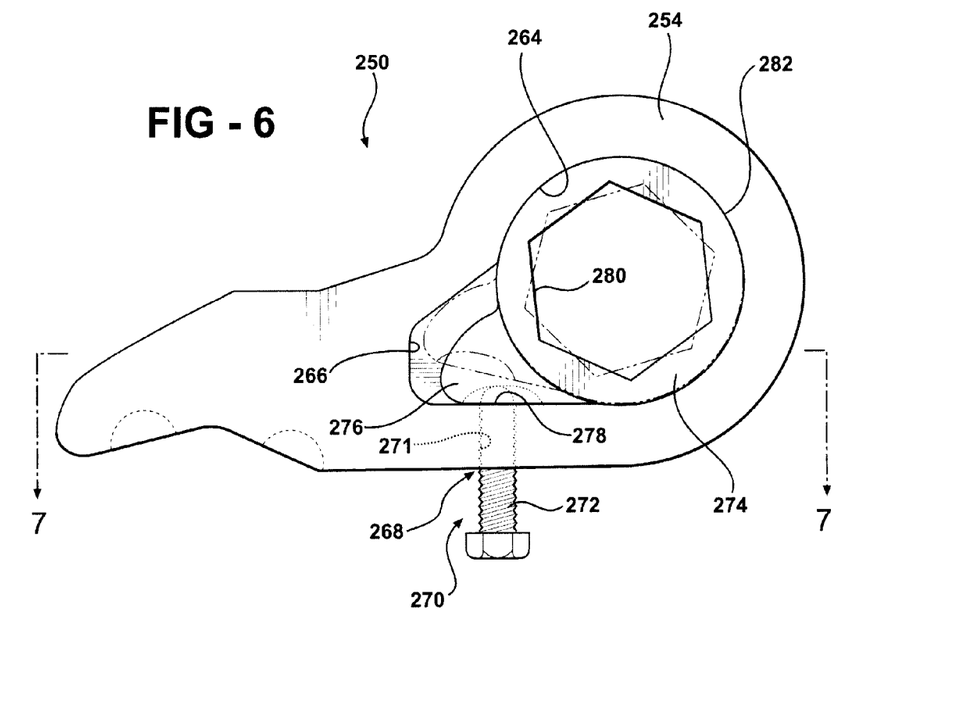
FIG. 6 is a side view of a second alternative embodiment of the adjustment lever of the present invention.
Figure 7:
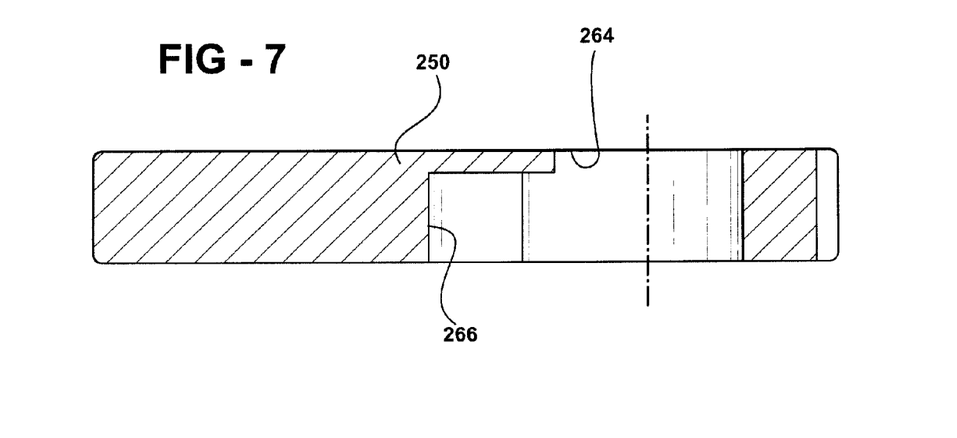
FIG. 7 is a cross sectional view taken along line 7-7 of FIG. 6.

FIGS. 6 and 7 show a second alternative embodiment of the present invention wherein like reference numerals are offset by 200. The adjustment lever is generally shown at 250 and includes the pivot portion 254 having the circular socket 264 defined therein. The circular socket 264 presents a radially extending tooth cavity 266 of a generally rectangular shape. An adjustment device, generally shown at 268 of the indexing system 270 facilitates an interaction between the adjustment lever 250 and a hub 274 for adjusting the angular position of the hub 274 relative to the adjustment lever 250 through an infinite number of the intermediate drive positions. The adjustment device 268 includes a bore 271 defined in the arm portion 254 extending inwardly from the adjustment lever 250 to the tooth cavity 266. The bore 270 is threaded to receive a screw 272 extending therethrough to engage the tooth 276 and to adjust the angular position of the hub 274 within the circular socket 264. The tooth 276 is integral with and extends radially outwardly from the hub 274. The tooth 276 of the hub 274 includes an indentation 278 designed to mate and react with the screw 272 in order to adjust the rotational position of the tooth 276 within the tooth cavity 266. The tooth cavity 266 has a greater angular space than the angular width of the tooth 276 to allow the tooth 276 to move angularly within the tooth cavity 266. The hexagonal socket 280 of the hub 274 receives the hexagonal head 48 of the torsion bar 46.

Figure 8:
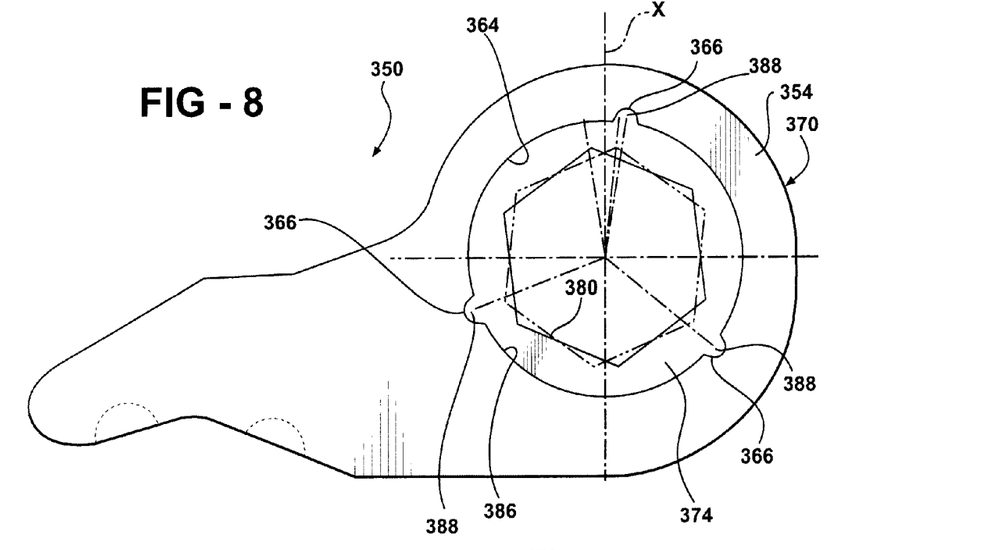
FIG. 8 is a side view of a third alternative embodiment of the adjustment lever of the present invention.

FIG. 8 shows a third alternative embodiment of the present invention similar wherein like reference numerals are offset by 300. The adjustment lever is generally shown at 350 and includes the pivot portion 354 and the circular socket 364, defined therein, with several rounded tooth cavities 366 extending therein and being angularly spaced 120 degrees from one another. The teeth cavities 366 set a range between −12 degrees to between about +21 degrees. The indexing system of the third alternative embodiment is generally shown at 370 and includes the hub 374 disposed in the adjustment lever 350. The hub 374 is independent of and removably invertible relative to the aforementioned adjustment lever 350. The hub 374 of the third alternative embodiment cooperates with the circular socket 364 of the pivot portion 354 and includes the inner surface or socket 380 having a hexagonal configuration for receiving the hexagonal head 48 of the torsion bar 46 and the outer periphery 386 of a circular configuration to mate with the circular socket 354. The outer surface 386 of the hub 374 includes the plurality of teeth 388 extending radially outwardly from the outer surface 386 to mate with the tooth cavities 372. The teeth 388 are disposed 120 degrees from one another to enable the hub 374 to be positioned angularly with respect to the circular socket 354 in any of the number of the selected positions. As alluded to above, the hub 374 may be removed and flipped about the secondary radial defined by one of the tooth 366 so that the primary radial defined by one of the apexes of the hexagonal socket 380 is disposed on the opposite singular side of the secondary radial, both shown in phantom. As shown in full lines in FIG. 8, the offset from the secondary radial extending centrally through a tooth 388 is offset from the primary radial extending through an apex of the hexagonal socket 380 by a greater angle with the primary and secondary radials on opposite sides of the X axis. In any case, the offset is from the centerline of one of the teeth interconnecting the hub and the adjustment lever. In this embodiment, the tooth 388 has a rounded configuration to complement with the tooth cavities 366.

Figure 9:
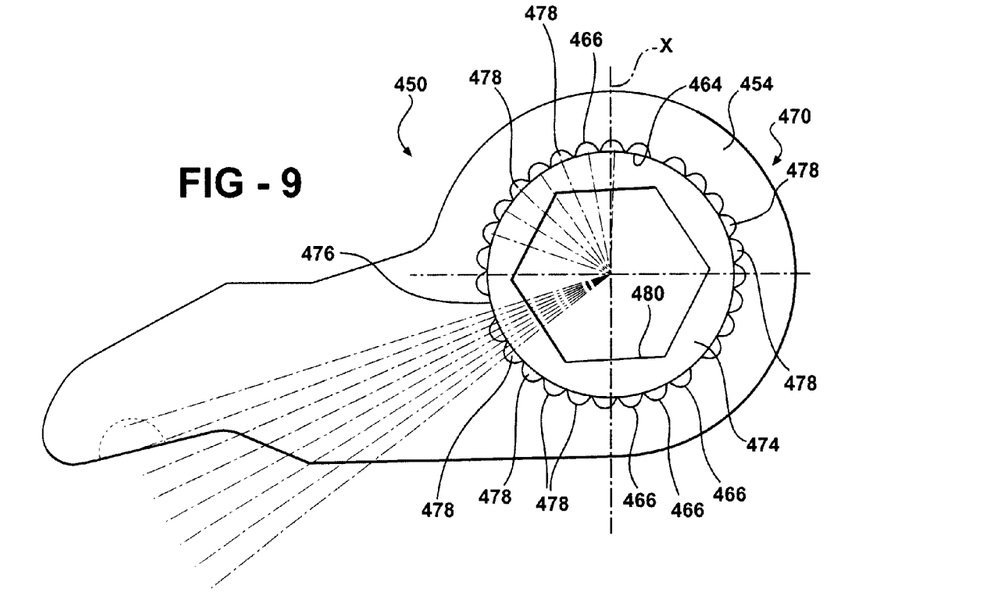
FIG. 9 is a side view of a fourth alternative embodiment of the adjustment lever of the present invention.

FIG. 9 shows a fourth alternative embodiment of the present invention similar to that of FIG. 5, and wherein like reference numerals are offset by 400. The adjustment lever is generally shown at 450 includes the pivot portion 454 and the circular socket 464 with the plurality of rounded tooth cavities 466 extending therein about the entire circumference of the circular socket 464. The indexing system of the fourth alternative embodiment is generally shown at 470 and includes the hub 474 disposed in the adjustment lever 450. The hub 474 is independent of and removably invertible relative to the aforementioned adjustment lever 450. The hub 474 cooperates with the circular socket 464 of the arm portion 454. The hub 474 includes the inner surface or socket 480 having a hexagonal configuration for receiving the hexagonal head 48 of the torsion bar 46 and the outer surface or periphery 476. The outer periphery 476 includes a plurality of teeth 478 adjacent one another and extending radially outwardly from the outer surface 476 about the entire circumference of the outer surface 476. The teeth 478 and the tooth cavities 466 enable the hub 474 to be positioned angularly in any of the number of the selected positions. In this embodiment, each tooth 478 includes a rounded configuration to mate with the tooth cavity 466.

Figure 10:
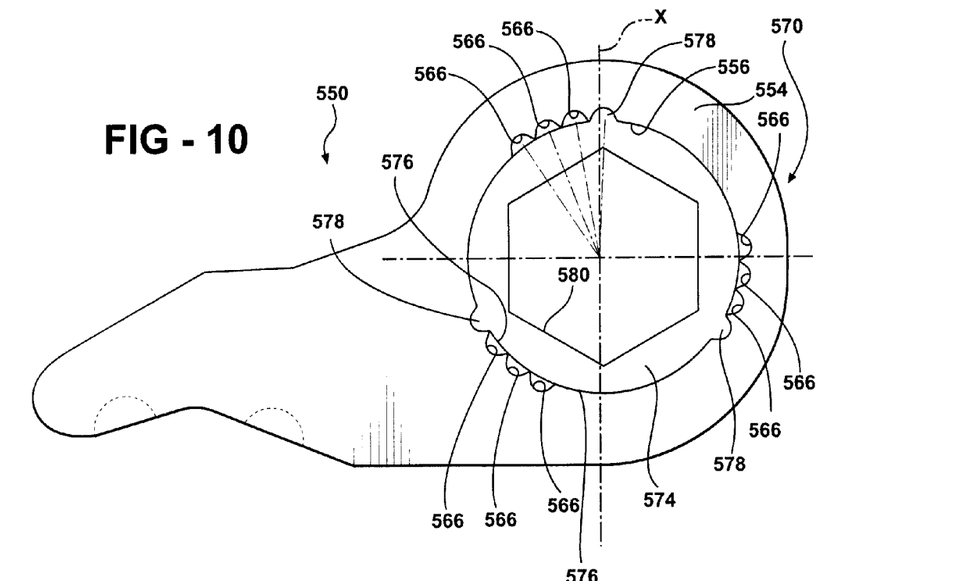
FIG. 10 is a side view of a fifth alternative embodiment of the adjustment lever of the present invention.

FIG. 10 shows a fifth alternative embodiment of the present invention similar to that of FIGS. 5 and 9, and wherein like reference numerals are offset by 500. The adjustment lever of the fifth embodiment is generally shown at 550 and includes the pivot portion 554 having the circular socket 556 defined therein. The adjustment lever 550 includes several rounded tooth cavities 566 adjacent and grouped with one another. The tooth cavities 566 extend radially into the circular socket 556 and define an increment of movement of 120 degrees between the groups of the tooth cavities 566. The tooth cavities 566 cover a setting range between −12 degrees and +21 degrees. The indexing system of the fifth alternative embodiment is generally shown at 570 and includes the hub 574 disposed in the adjustment lever 550. The hub 574 is independent of and removably invertible relative to the aforementioned adjustment lever 550. The hub 574 is disposed within the circular socket 556. The hub 574 includes the outer surface or periphery 576 and an inner surface or socket 580 having a hexagonal configuration for receiving the hexagonal head 48 of the torsion bar 46. The outer periphery 576 of the hub 574 includes the plurality of teeth 578 adjacent one another and extending outwardly from the outer surface 576 along the entire circumference of the outer surface 576. The teeth 578 are separated by 120 degrees between the three groups to enable the hub 574 to be positioned angularly with respect to the tooth cavities 566 extending inwardly into the circular socket 556 in any of the number of the selected positions. In this embodiment, the tooth 578 has a rounded configuration to mate with the tooth cavity 566.

Figure 11:
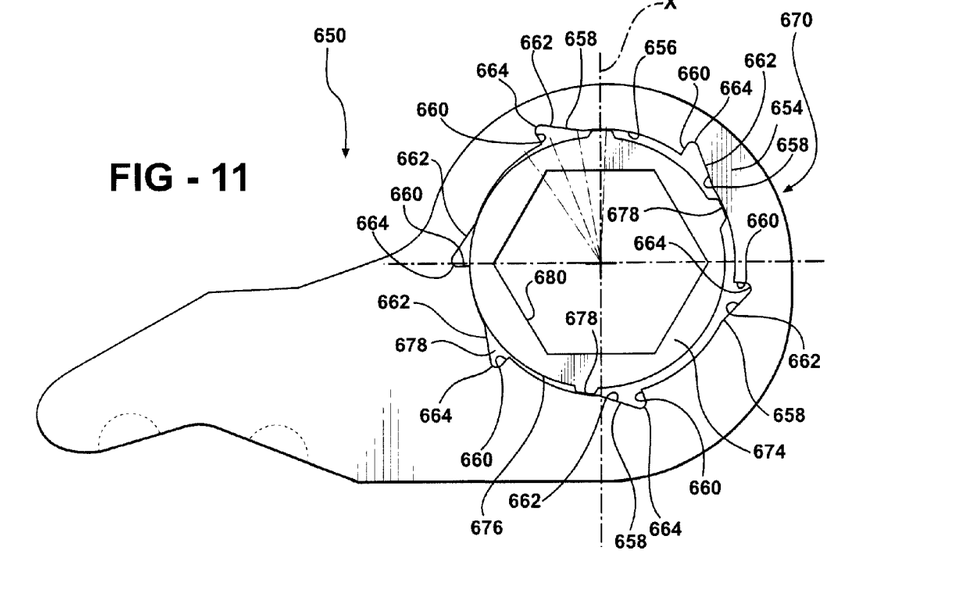
FIG. 11 is a side view of a sixth alternative embodiment of the adjustment lever of the present invention.

FIG. 11 shows a sixth alternative embodiment of the present invention wherein like reference numerals are offset by 600. The adjustment lever of the sixth embodiment is generally shown at 650 includes the arm pivot 654 having the socket 656 of a generally circular configuration defined therein and the plurality of tooth cavities 658 defined therein. Each tooth cavity 658 presents a triangular configuration having two sides 660, 662 interconnected by a rounded bottom 664 with one side 660 sloping at a degree different than the other side 662. The indexing system of the sixth alternative embodiment is generally shown at 670 and includes the hub 674 disposed in the adjustment lever 650. The hub 674 includes an outer surface 676. The outer surface 676 of the hub 674 includes a plurality of teeth 678 extending radially outwardly from the outer surface 676. One of the teeth 678 presents a triangular configuration complementary to the configuration of tooth cavity. The other teeth 678 include a rectangular configuration and are designed to maintain a constant contact of the hub 674 with the adjustment lever 650. The inner surface or socket 680 of the hub 674 includes a hexagonal configuration for receiving the hexagonal head 48 of the torsion bar 46. The sixth embodiment of the present invention provides incremental adjustments in a range from +3 degrees to about +15 degrees.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A suspension assembly in an automobile vehicle comprising:
 a support frame;
 a control arm movable relative to said support frame;
 a torsion bar connected to said control arm for resisting movement of said control arm relative to said support frame;
 an adjustment lever connected to said torsion bar for placing said torsion bar in torsion;
 a torsion bar connection between said adjustment lever and said torsion bar for connecting said adjustment lever to said torsion bar at a plurality of primary drive positions at first angular increments relative to one another; and
 an indexing system operatively disposed between and directly interconnecting said torsion bar connection and said adjustment lever for positioning said adjustment lever at a plurality of intermediate drive positions at second angular increments;
 wherein said indexing system includes a hub independent of said adjustment lever and including said torsion bar connection to said torsion bar at said first angular increments;
 wherein said indexing system includes a hub connection between said hub and said adjustment lever to position said hub angularly relative to said adjustment lever at said second angular increments;
 wherein said indexing system includes at least one tooth extending radially from said hub and a tooth cavity in said adjustment lever for receiving said at least one tooth; wherein said tooth cavity extends angularly a greater degree than said tooth for allowing said hub to rotate relative to said adjustment lever.

2. An assembly (40) as set forth in claim 1 including an adjustment device (268) interacting between said adjustment lever (250) and said tooth (276) for adjusting the angular position of said hub (274) relative to said adjustment lever (250) through an infinite number of said intermediate drive positions within the angular extent of said tooth cavity (266).

3. An assembly (40) as set forth in claim 2 wherein said adjustment device (268) includes a bore (271) in said adjustment lever (250) and a screw (272) extending through said bore (271) to engage said tooth (276) and adjust the angular position of said hub (274).

4. An assembly (40) as set forth in claim 1 wherein said at least one tooth cavity presents a generally triangular configuration having two sides and a rounded bottom interconnecting said two sides, and wherein one of said two sides slopes at a degree different than the other side.

5. An adjustment lever for applying torsion to a torsion bar for resisting movement of a control arm relative to a support frame in a vehicle; said adjustment lever comprising:
 a torsion bar connection for connecting said adjustment lever to the torsion bar at a plurality of primary drive positions at first angular increments relative to one another;
 an indexing system operatively disposed between and directly interconnecting said torsion bar connection and said adjustment lever for positioning said adjustment lever at a plurality of intermediate drive positions at second angular increments;
 wherein said indexing system includes a hub independent of said adjustment lever and including said torsion bar connection for connection to the torsion bar;
 wherein said indexing system includes a hub connection between said hub and said adjustment lever to position said hub angularly relative to said adjustment lever at said second angular increments;
 wherein said indexing system includes at least one tooth extending radially from said hub and a tooth cavity in said adjustment lever for receiving said at least one tooth; and
 wherein said tooth cavity extends angularly a greater degree than said tooth for allowing said hub to rotate relative to said adjustment lever.

6. An adjustment lever (250) as set forth in claim 5 including an adjustment device (268) interacting between said adjustment lever (250) and said tooth (276) for adjusting the angular position of said hub (274) relative to said adjustment lever (250) through an infinite number of said intermediate drive positions within the angular extent of said tooth cavity (266).

7. An apparatus for extending the useful life of a torsion bar in a vehicular suspension assembly, said apparatus comprising:
 a support frame;

a control arm movable relative to said support frame for carrying a wheel;

a torsion bar extending between a control end and an anchored end, said control end directly connected to said control arm for torsionally resisting movement of said control arm relative to said support frame, said anchored end of said torsion bar including a hex-shaped fitting consisting of six points arranged in equal angular increments of 60° relative to one another;

an adjustment lever supported in said frame and pivotally moveable for twisting said torsion bar so as to increase or decrease the position of said control arm relative to said frame, said adjustment lever having a pivot portion operatively connected to said adjustment end of said torsion bar and a distal swinging tip portion;

a screw adjustment mechanism operatively engaging said tip portion of said adjustment lever for precisely and infinitely inducing twist in said torsion bar within the limited range of pivotal movement of said adjustment lever; and an intermediate hub removably disposed in said pivot portion of said adjustment lever, said hub having a hex-shaped opening adapted for mating engagement with said hex-shaped fitting on said adjustment end of said torsion bar and a toothed outer periphery consisting of equally angularly spaced apart teeth slideably received in a complimentary-shaped pocket in said pivot portion of said adjustment lever, whereby the useful life of a fatigued torsion bar can be extended by completely disengaging said hub from said adjustment lever and said torsion bar, and then re-engaging said hub with said torsion bar and said adjustment lever in a new relative position resulting in an incremental adjustment of said tip portion relative to said torsion bar so that said screw adjustment mechanism remains operative to infinitely induce twist in said torsion bar while said adjustment lever remains supported in said frame within its limited range of pivotal movement.

8. An apparatus as set forth in claim 7 wherein each said tooth on said outer periphery of said hub is aligned along an imaginary radial passing centrally therethrough, and wherein none of said six points of said hex-shaped opening coincide with said imaginary radial passing centrally through each of said respective teeth in said pocket, whereby the useful life of a fatigued torsion bar can be extended by completely disengaging said hub from said adjustment lever and then re-engaging said hub with said adjustment lever in a new relative position resulting in a slight incremental adjustment of said tip portion relative to the torsion bar.

9. An apparatus as set forth in claim 7 wherein the number of said teeth on said outer periphery of said hub is not equal to the number of said points in said hex-shaped opening.

10. An apparatus as set forth in claim 7 wherein said hub includes exactly seven teeth and said pocket in said adjustment lever includes exactly seven tooth cavities for slideably receiving said seven teeth of said hub.

11. An adjustment lever for extending the useful life of a torsion bar in a vehicular suspension assembly, said lever comprising:

a body having a pivot portion at one end thereof, a tip portion at another end thereof, and a central lever portion extending between said pivot and tip portions, said pivot portion including a pocket formed by a toothed inner periphery defined by a plurality of equally angularly spaced apart teeth, each said tooth aligned along a respective imaginary radial passing centrally therethrough;

an intermediate hub removably disposed in said toothed pocket of said body, said hub having a hex-shaped opening and a toothed outer periphery consisting of equally angularly spaced apart teeth slideably received in said pocket of said body, said hex-shaped opening defined by six points arranged in equal angular increments of 60° relative to one another; and wherein none of said six points of said hex-shaped opening coincide with said imaginary radial passing centrally through each of said respective teeth in said pocket, whereby the useful life of a fatigued torsion bar can be extended by completely disengaging said hub from said adjustment lever and then re-engaging said hub with said adjustment lever in a new relative position resulting in an incremental adjustment of said tip portion relative to the torsion bar.

12. An adjustment as set forth in claim 11 wherein the number of said teeth is not equal to the number of said points in said hex-shaped opening.

13. An adjustment lever as set forth in claim 11 wherein said hub includes exactly seven teeth and said pocket in said adjustment lever includes exactly seven tooth cavities for slideably receiving said seven teeth of said hub.

* * * * *